United States Patent
Senf, Jr.

(10) Patent No.: US 12,244,245 B2
(45) Date of Patent: Mar. 4, 2025

(54) TRANSPORT REFRIGERATION SYSTEM WITH PARALLELED INVERTERS

(71) Applicant: Carrier Corporation, Palm Beach Gardens, FL (US)

(72) Inventor: Raymond L. Senf, Jr., Central Square, NY (US)

(73) Assignee: CARRIER CORPORATION, Palm Beach Gardens, FL (US)

( * ) Notice: Subject to any disclaimer, the term of this patent is extended or adjusted under 35 U.S.C. 154(b) by 93 days.

(21) Appl. No.: 17/503,624

(22) Filed: Oct. 18, 2021

(65) Prior Publication Data

US 2023/0119462 A1  Apr. 20, 2023

(51) Int. Cl.
*H02M 7/493* (2007.01)
*B60P 3/20* (2006.01)

(52) U.S. Cl.
CPC .............. *H02M 7/493* (2013.01); *B60P 3/20* (2013.01)

(58) Field of Classification Search
CPC ........................................... H02M 7/42–7/98
See application file for complete search history.

(56) References Cited

U.S. PATENT DOCUMENTS

| | | | |
|---|---|---|---|
| 6,622,505 B2 | 9/2003 | Anderson et al. | |
| 7,164,242 B2 | 1/2007 | Federman et al. | |
| 7,193,826 B2 | 3/2007 | Crane et al. | |
| 7,878,013 B2 | 2/2011 | Matsuno et al. | |
| 8,014,110 B2 | 9/2011 | Schnetzka et al. | |
| 8,098,505 B1* | 1/2012 | Choi | H02M 1/4225 323/272 |
| 8,441,150 B2 | 5/2013 | Terorde | |
| 8,872,461 B2 | 10/2014 | Kaneko | |
| 10,128,775 B2 | 11/2018 | Shimomugi et al. | |
| 10,281,185 B2 | 5/2019 | Uemura et al. | |
| 10,465,965 B2 | 11/2019 | Yamakawa et al. | |
| 10,495,340 B2 | 12/2019 | Shimura et al. | |

(Continued)

FOREIGN PATENT DOCUMENTS

| | | |
|---|---|---|
| CN | 106797187 A | 5/2017 |
| EP | 1796255 B1 | 2/2016 |

(Continued)

OTHER PUBLICATIONS

H.-H. Hsu and Y.-Y. Tzou, "FPGA control and implementation of a multiphase-interleaved PWM inverter for a segmented PMSM," 2015 IEEE 11th International Conference on Power Electronics and Drive Systems, Sydney, NSW, Australia, 2015, pp. 224-230, doi: 10.1109/PEDS.2015.7203410. (Year: 2015).*

(Continued)

*Primary Examiner* — Peter M Novak
(74) *Attorney, Agent, or Firm* — CANTOR COLBURN LLP

(57) ABSTRACT

A method of operating a transport refrigeration system having a plurality of inverters configured to power a refrigeration unit includes placing a first inverter of the plurality of inverters in an active state; monitoring a load on the first inverter; comparing the load on the first inverter to an upper threshold; placing a second inverter of the plurality of inverters in an active state upon the load on the first inverter being greater than the upper threshold.

7 Claims, 3 Drawing Sheets

(56) References Cited

U.S. PATENT DOCUMENTS

| | | | |
|---|---|---|---|
| 2005/0151019 A1* | 7/2005 | Stevens .................. | B64D 37/32 244/135 R |
| 2005/0204760 A1 | 9/2005 | Kurita et al. | |
| 2014/0180953 A1 | 6/2014 | Westcott et al. | |
| 2016/0183408 A1 | 6/2016 | Sutherland et al. | |
| 2021/0070135 A1 | 3/2021 | Andrade Dias et al. | |
| 2021/0070136 A1 | 3/2021 | Schumacher | |
| 2021/0135595 A1 | 5/2021 | Chen et al. | |
| 2021/0302089 A1 | 9/2021 | Taras | |

FOREIGN PATENT DOCUMENTS

| | | |
|---|---|---|
| KR | 20100003580 A | 1/2010 |
| KR | 20180079821 A | 7/2018 |
| RU | 196661 U1 | 3/2020 |

OTHER PUBLICATIONS

European Search Report for Application No. 22201914.3; Issued Mar. 27, 2023; 8 Pages.

* cited by examiner

TRANSPORT REFRIGERATION SYSTEM WITH PARALLELED INVERTERS

BACKGROUND

The embodiments disclosed herein generally relate to transport refrigeration systems and more specifically, to transport refrigeration systems that employ inverters connected in parallel to supply power to one or more loads.

Typically, cold chain distribution systems transport and distribute cargo. Specifically perishable goods and environmentally sensitive goods (herein referred to as perishable goods) that susceptible to temperature, humidity, and other environmental factors. Perishable goods may include but are not limited to fruits, vegetables, grains, beans, nuts, eggs, dairy, seed, flowers, meat, poultry, fish, ice, and pharmaceuticals. Advantageously, cold chain distribution systems allow perishable goods to be effectively transported and distributed without damage or other undesirable effects.

Refrigerated cargo space is commonly transports perishable goods in a cold chain distribution system. The refrigerated cargo space may be implemented in a shipping container or in conjunction with a truck or trailer. A transport refrigeration system maintains a controlled temperature environment within the cargo space.

Transport refrigeration units may be configured to serve varying demands. For example, a box truck for local routes may have much lower power requirements than a shipping container intended to global transport. The inverters used to power loads of the refrigeration units are typically customized to serve the specific power demands of the refrigeration unit. Developing inverters for individual transportation and refrigeration environments add complexity, cost, time and risk.

BRIEF DESCRIPTION OF THE DISCLOSURE

According to one embodiment, a method of operating a transport refrigeration system having a plurality of inverters configured to power a refrigeration unit includes: placing a first inverter of the plurality of inverters in an active state; monitoring a load on the first inverter; comparing the load on the first inverter to an upper threshold; placing a second inverter of the plurality of inverters in an active state upon the load on the first inverter being greater than the upper threshold.

In addition to one or more of the features described above, or as an alternative, further embodiments may include wherein the load on the first inverter is an electrical parameter of the first inverter.

In addition to one or more of the features described above, or as an alternative, further embodiments may include wherein the load on the first inverter is a temperature of the first inverter.

In addition to one or more of the features described above, or as an alternative, further embodiments may include monitoring the load on the first inverter; monitoring the load on the second inverter; comparing the load on the first inverter and the load on the second inverter to a lower threshold; placing one of the first inverter and the second inverter in an inactive state upon the load on the first inverter and the load on the second inverter being less than the lower threshold.

According to another embodiment, a controller of a transport refrigeration system having a plurality of inverters configured to power a refrigeration unit, the controller including: a processor; a memory comprising computer-executable instructions that, when executed by the processor, cause the processor to perform operations, the operations including: placing a first inverter of the plurality of inverters in an active state; monitoring a load on the first inverter; comparing the load on the first inverter to an upper threshold; placing a second inverter of the plurality of inverters in an active state upon the load on the first inverter being greater than the upper threshold.

In addition to one or more of the features described above, or as an alternative, further embodiments may include wherein the load on the first inverter is an electrical parameter of the first inverter.

In addition to one or more of the features described above, or as an alternative, further embodiments may include wherein the load on the first inverter is a temperature of the first inverter.

In addition to one or more of the features described above, or as an alternative, further embodiments may include the operations further including: monitoring the load on the first inverter; monitoring the load on the second inverter; comparing the load on the first inverter and the load on the second inverter to a lower threshold; placing one of the first inverter and the second inverter in an inactive state upon the load on the first inverter and the load on the second inverter being less than the lower threshold.

Technical effects of embodiments of the present disclosure include the use of a plurality of inverters that can be coupled in parallel as needed to serve loads of a refrigeration unit.

The foregoing features and elements may be combined in various combinations without exclusivity, unless expressly indicated otherwise. These features and elements as well as the operation thereof will become more apparent in light of the following description and the accompanying drawings. It should be understood, however, that the following description and drawings are intended to be illustrative and explanatory in nature and non-limiting.

BRIEF DESCRIPTION OF THE DRAWINGS

The subject matter which is regarded as the disclosure is particularly pointed out and distinctly claimed in the claims at the conclusion of the specification. The foregoing and other features and advantages of the disclosure are apparent from the following detailed description taken in conjunction with the accompanying drawings in which:

DETAILED DESCRIPTION

Figure 1:
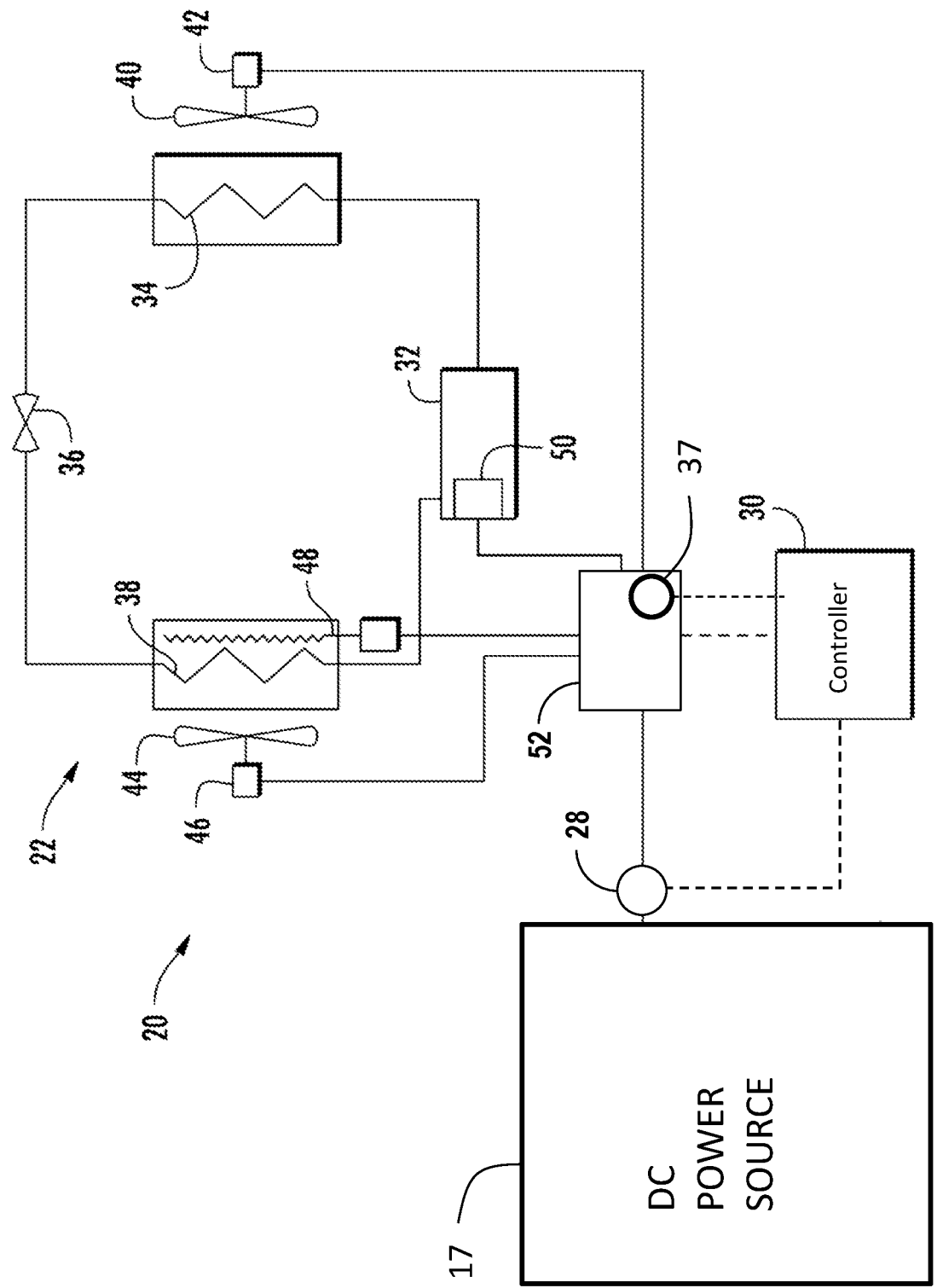
FIG. 1 is a schematic illustration of a transport refrigeration system in an example embodiment.

Referring to FIG. 1, a transport refrigeration system 20 includes a refrigeration unit 22. The refrigeration unit 22 functions, under the control of a controller 30, to establish and regulate a desired product storage temperature within a refrigerated cargo space wherein a perishable product is stored during transport and to maintain the product storage temperature within a specified temperature range. The refrigerated cargo space may be the cargo box of a trailer, a truck, a seaboard shipping container or an intermodal container wherein perishable cargo, such as, for example, produce, meat, poultry, fish, dairy products, cut flowers, pharmaceuticals, and other fresh or frozen perishable products, is stowed for transport.

The refrigeration unit 22 includes a refrigerant compression device 32, a refrigerant heat rejection heat exchanger 34, an expansion device 36, and a refrigerant heat absorption heat exchanger 38 connected in refrigerant flow communication in a closed loop refrigerant circuit and arranged in a conventional refrigeration cycle. The refrigeration unit 22 also includes one or more fans 40 associated with the refrigerant heat rejection heat exchanger 34 and driven by fan motor(s) 42 and one or more fans 44 associated with the refrigerant heat absorption heat exchanger 38 and driven by fan motor(s) 46. The refrigeration unit 22 may also include an electric resistance heater 48 associated with the refrigerant heat absorption heat exchanger 38. The electric resistance heater 48 may be used, for example, for defrost or temperature control. It is to be understood that other components (not shown) may be incorporated into the refrigerant circuit as desired, including for example, but not limited to, a suction modulation valve, a receiver, a filter/dryer, an economizer circuit.

The refrigerant heat rejection heat exchanger 34 may, for example, comprise one or more refrigerant conveying coiled tubes or one or more tube banks formed of a plurality of refrigerant conveying tubes extending between respective inlet and outlet manifolds. The fan(s) 40 are operative to pass air, typically ambient air, across the tubes of the refrigerant heat rejection heat exchanger 34 to cool refrigerant vapor passing through the tubes. The refrigerant heat rejection heat exchanger 34 may operate either as a refrigerant condenser, such as if the refrigeration unit 22 is operating in a subcritical refrigerant cycle or as a refrigerant gas cooler, such as if the refrigeration unit 22 is operating in a transcritical cycle.

The refrigerant heat absorption heat exchanger 38 may, for example, also comprise one or more refrigerant conveying coiled tubes or one or more tube banks formed of a plurality of refrigerant conveying tubes extending between respective inlet and outlet manifolds. The fan(s) 44 are operative to pass air drawn from the temperature controlled cargo box across the tubes of the refrigerant heat absorption heat exchanger 38 to heat and evaporate refrigerant liquid passing through the tubes and cool the air. The air cooled in traversing the refrigerant heat rejection heat exchanger 38 is supplied back to the temperature controlled cargo box. It is to be understood that the term "air" when used herein with reference to the atmosphere within the cargo box includes mixtures of air with other gases, such as for example, but not limited to, nitrogen or carbon dioxide, sometimes introduced into a refrigerated cargo box for transport of perishable produce.

The refrigerant compression device 32 may comprise a single-stage or multiple-stage compressor such as, for example, a reciprocating compressor or a scroll compressor. The compression device 32 has a compression mechanism (not shown) driven by an electric motor 50. In an embodiment, the motor 50 may be disposed internally within the compressor with a drive shaft interconnected with a shaft of the compression mechanism, all sealed within a common housing of the compression device 32.

The refrigeration system 20 also includes a controller 30 configured for controlling operation of the refrigeration system 20 including, but not limited to, operation of various components of the refrigerant unit 22 to provide and maintain a desired thermal environment within the cargo box of the truck or trailer, that is within the temperature controlled space in which a perishable product is stowed. The controller 30 may be an electronic controller including a microprocessor and an associated memory. The controller 30 controls operation of various components of the refrigerant unit 22, such as the refrigerant compression device 32 and its associated drive motor 50, the fan motors 42, 46 and the electric resistance heater 48.

The refrigeration unit 22 has a plurality of power demand loads, including, but not limited to, the compression device drive motor 50, the drive motor 42 for the fan 40 associated with the refrigerant heat rejection heat exchanger 34, and the drive motor 46 for the fan 44 associated with the refrigerant heat absorption heat exchanger 38. In the depicted embodiment, the electric resistance heater 48 also constitutes a power demand load. The electric resistance heater may be selectively operated by the controller 30 whenever a control temperature within the temperature controlled cargo box drops below a preset lower temperature limit, which may occur in a cold ambient environment. In such an event the controller 30 would activate the electric resistance heater 48 to heat air circulated over the electric resistance heater by the fan(s) 44 associated with the refrigerant heat absorption heat exchanger 38.

The compression device 32 and its associated drive motor 50, the fan motors 42, 46 and the electric resistance heater 48 represent loads of the transport refrigeration unit 22. One or more of the loads is powered by AC power generated by an inverter assembly 52. The inverter assembly 52 includes a plurality of inverters that convert DC power from a DC power source 17 into AC power to power one or more loads of the transport refrigeration unit 22. The DC power source 17 may be a battery or may be an AC-DC converter that converts an AC input (e.g., from grid power and/or a generator) to DC power. One or more sensors 37 are installed at the inverter assembly 52 to monitor a load on the one or more operating inverters in the inverter assembly 52. The sensor(s) 37 may monitor load on an inverter by measuring electrical parameters (e.g., current, voltage, power) and/or physical parameters (e.g., temperature).

Figure 2:
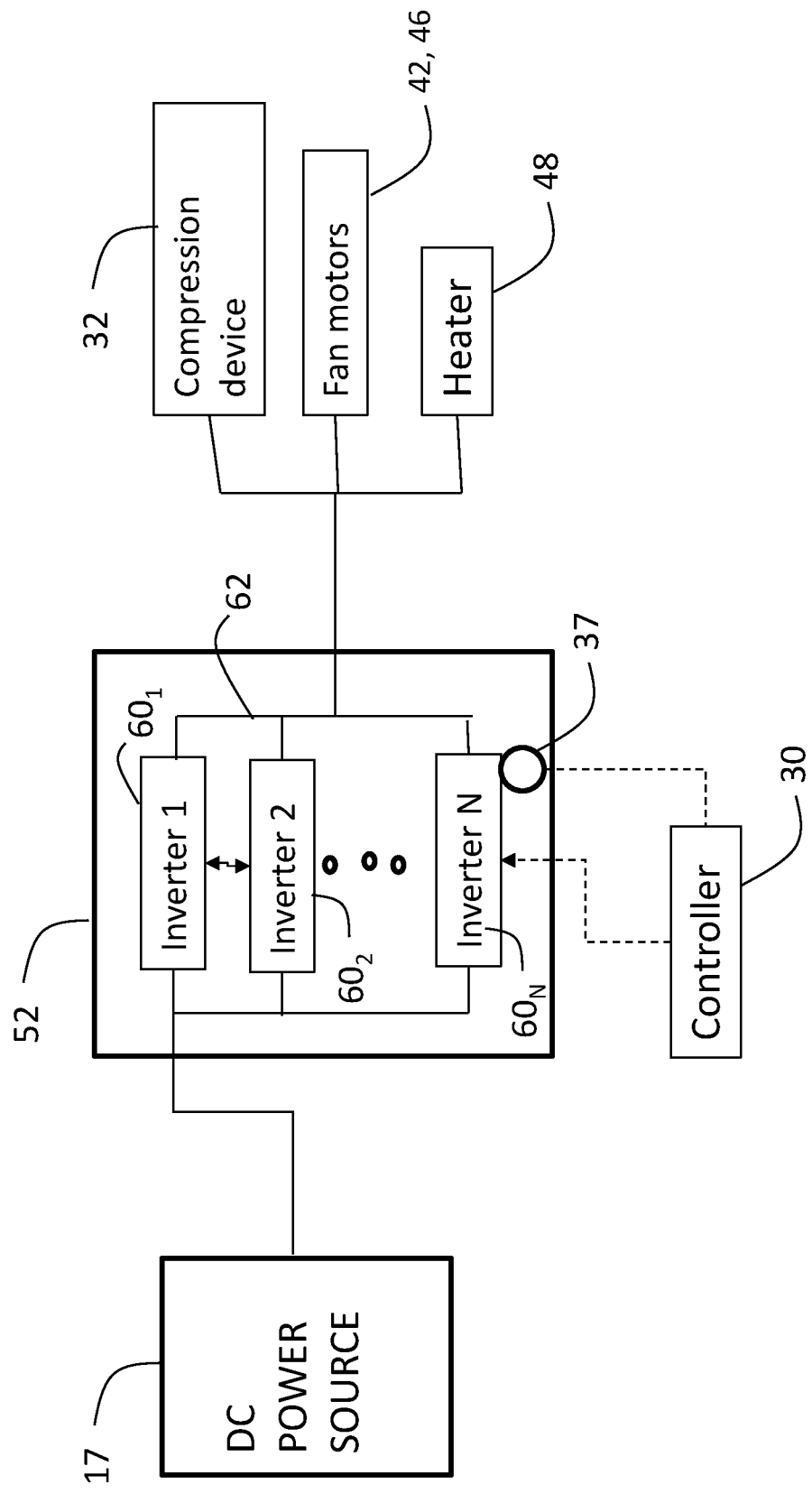
FIG. 2 is a schematic illustration of an inverter assembly and refrigeration unit loads in an example embodiment.

FIG. 2 depicts the inverter assembly 52 in further detail in an example embodiment. The inverter assembly 52 includes at least two inverters $60_1$-$60_N$ having an input connected to the DC power source 17 and an output connected to at least one load of the refrigeration unit 22. Example loads shown in FIG. 2 include the compression device 32, fan motors 42 and 46 and heater 48. The outputs of the inverters $60_1$-$60_N$ are connected in electrical parallel to a common AC output 62. A sensor 37 is shown associated with inverter N, but it should be understood that a sensor 37 may be associated with each individual inverter 60. The sensor(s) 37 may monitor load on an inverter 60 by measuring electrical parameters (e.g., current, voltage, power) and/or physical parameters (e.g., temperature). The inverters $60_1$-$60_N$ may all have a similar power rating and may be identical devices in an example embodiment.

In operation, the controller 30 is in communication with the inverters $60_1$-$60_N$ and the sensor(s) 37. The controller 30 sends commands to each of the inverters $60_1$-$60_N$ to enter an active state (i.e., produce AC power) or an inactive state (i.e., do not produce AC power). The controller 30 determines how many inverters $60_1$-$60_N$ should be in an active state in response to parameters measured by one or more sensors 37.

Figure 3:
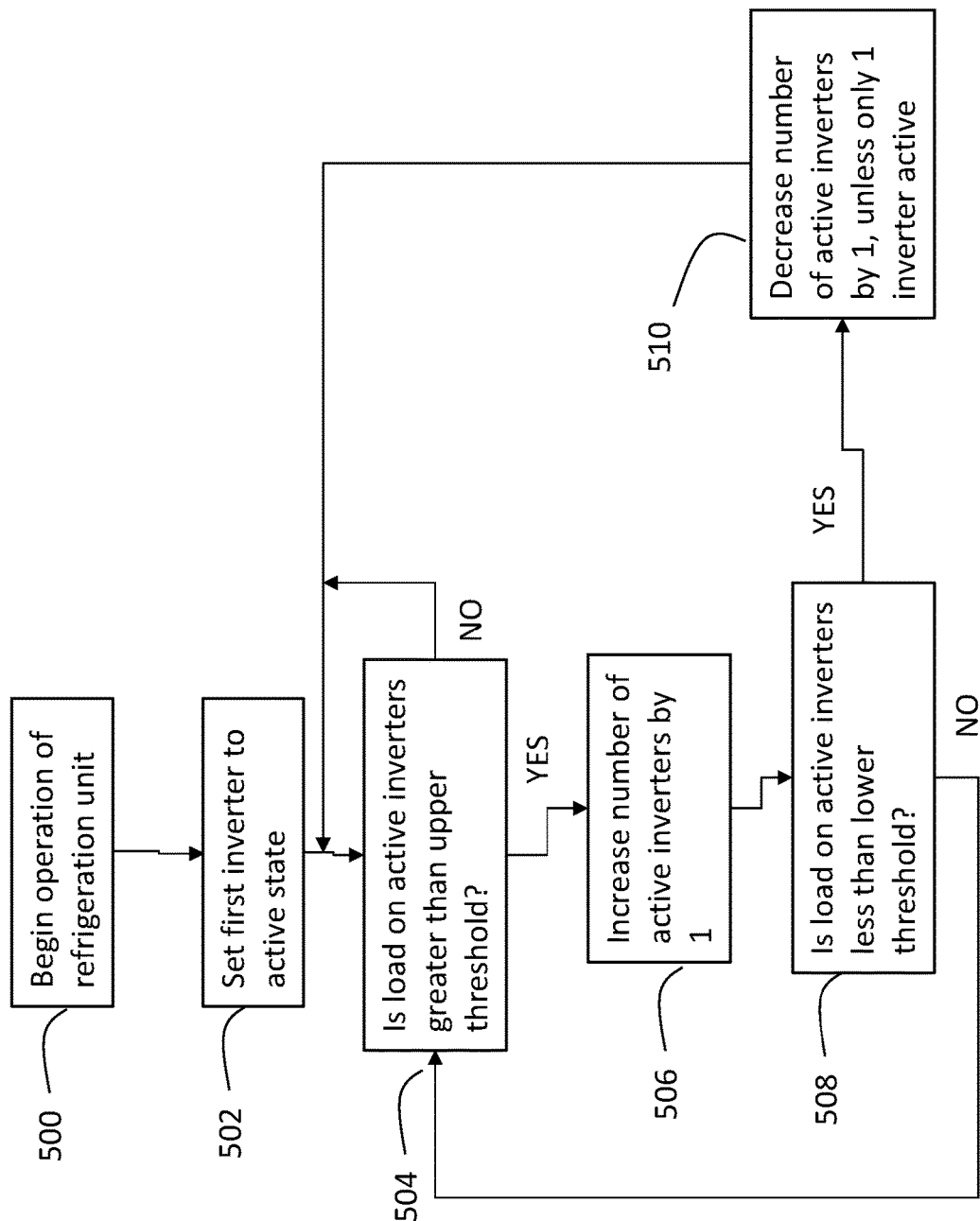
FIG. 3 is a flowchart of a process for controlling inverters in an example embodiment.

FIG. 3 is a flowchart of a process for controlling the inverters $60_1$-$60_N$ in an example embodiment. The process begins at 500 where the refrigeration unit 22 begins operation and a single inverter $60_1$ is set to the active state to produce AC power at 502. At 504, the controller 30 determines if the load on each inverter in the active state is greater than an upper threshold. At this point, only one inverter $60_1$ is in the active state. The load on each inverter in the active state may be determined based on sensors 37 associated with the inverters $60_1$-$60_N$. The sensor(s) 37 may monitor load on an inverter 60 by measuring electrical parameters (e.g., current, voltage, power) and/or physical parameters (e.g., temperature). The upper threshold may be represented as a percentage (e.g., 90% electrical limit or 90% of temperature limit) or as a numerical value (e.g., current greater than 8 Amps or temperature greater than 120 degrees Fahrenheit).

If at 504, the controller 30 determines that the load on each inverter in the active state is less than the upper threshold, the refrigeration unit 22 continues to operate with the current number of inverters 60 in an active state. If at 504, the controller 30 determines that the load on each inverter in the active state is greater than the upper threshold, flow proceeds to 506 where the number of active inverters 60 is increased by 1, until all the inverters al in use. The controller 30 send a command to another inverter $60_2$ to enter an active state. At this stage, the two inverters $60_1$ and $60_2$ provide AC power to supply the loads of the refrigeration unit 22.

At 508, the controller 30 determines if the load on each inverter 60 in the active state is less than a lower threshold. The lower threshold may be represented as a percentage (e.g., 25% electrical limit or 30% of temperature limit) or as a numerical value (e.g., current less than 1 Amp or temperature less than 40 degrees Fahrenheit).

If at 508, the controller 30 determines that the load on each inverter 60 in the active state is not less than the lower threshold, flow proceeds to 504 and the number of inverters 60 in the active state remains the same. If at 508, the controller 30 determines that the load on each inverter 60 in the active state is less than the lower threshold, flow proceeds to 510. At 510, the controller 30 sends a command to decrease the number of inverters 60 in the active state, unless there is only one inverter in the active state. For example, if two inverters $60_1$ and $60_2$ are operating at a load less than the lower threshold (e.g., each producing less than 1 Amp), there is no need to have both inverters $60_1$ and $60_2$ in the active state. At 510, one of inverters $60_1$ and $60_2$ would be changed to the inactive state.

A number of techniques may be used to control the AC output of each inverter $60_1$-$60_N$ so that the AC outputs can be effectively paralleled at common AC output 62. In general, the controller 30 and/or the inverters $60_1$-$60_N$ communicate to synchronize the AC outputs of each inverter $60_1$-$60_N$ in frequency and phase so the AC outputs can be effectively paralleled at common AC output 62. Each inverter $60_1$-$60_N$ may include a local controller to enable communications between inverters $60_1$-$60_N$. During operation, a first inverter $60_1$ communicates to the second inverter $60_2$ when a reference point has occurred in a pulse width modulation (PWM) signal from controller 30. The second inverter $60_2$ then determines when the reference point occurs in its PWM signal from controller 30. If there is a difference between when the reference point occurs in the first PWM signal at the first inverter $60_1$ and when the reference point occurs in the second PWM signal at the second inverter $60_2$, then one or both of the first inverter $60_1$ and the second inverter $60_2$ may adjust the period of the PWM signals such that the reference points occur at the same time. The first inverter $60_1$ and the second inverter $60_2$ may use known techniques to adjust the period of the PWM signals, such as a phase locked loop technique to reduce error between when the reference points occurs in control signal and when the reference point occurs in control signal. This improves synchronization of the control signals between first inverter $60_1$ and the second inverter $60_2$. The control signal synchronization as described may be used with any number of inverters 60.

The inverters $60_1$-$60_N$ may be multiphase inverters, producing multiphase AC outputs. In this configuration, each individual phase from each inverter $60_1$-$60_N$ would be paralleled at the common AC output 62.

Embodiments of the disclosure allow the use of multiple inverters $60_1$-$60_N$, connected in electrical parallel. This allows a single inverter design to be used, which reduces complexity in using a single inverter customized for a specific refrigeration unit loads. For high power loads, embodiments can simply use additional inverters arranged in parallel, rather than a customized high power inverter.

As described above, embodiments can be in the form of processor-implemented processes and devices for practicing those processes, such as a processor in controller 30. Embodiments can also be in the form of computer program code containing instructions embodied in tangible media, such as network cloud storage, SD cards, flash drives, diskettes, CD ROMs, hard drives, or any other computer-readable storage medium, wherein, when the computer program code is loaded into and executed by a computer, the computer becomes a device for practicing the embodiments. Embodiments can also be in the form of computer program code, for example, whether stored in a storage medium, loaded into and/or executed by a computer, or transmitted over some transmission medium, loaded into and/or executed by a computer, or transmitted over some transmission medium, such as over electrical wiring or cabling, through fiber optics, or via electromagnetic radiation, wherein, when the computer program code is loaded into an executed by a computer, the computer becomes an device for practicing the embodiments. When implemented on a general-purpose microprocessor, the computer program code segments configure the microprocessor to create specific logic circuits.

While the disclosure has been described in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that aspects of the disclosure may include only some of the described embodiments. Accordingly, the disclosure is not to be seen as limited by the foregoing description, but is only limited by the scope of the appended claims.

What is claimed is:

1. A method of operating a transport refrigeration system having a plurality of inverters configured to power a refrigeration unit, the method comprising:
    placing a first inverter of the plurality of inverters in an active state;
    monitoring a load on the first inverter;
    comparing the load on the first inverter to an upper threshold;
    placing a second inverter of the plurality of inverters in an active state upon the load on the first inverter being greater than the upper threshold;
    monitoring the load on the first inverter;
    monitoring the load on the second inverter;

comparing the load on the first inverter and the load on the second inverter to a lower threshold;

placing one of the first inverter and the second inverter in an inactive state upon the load on the first inverter and the load on the second inverter being less than the lower threshold;

wherein the upper threshold and the lower threshold are different values;

wherein the first inverter and the second inverter are multiphase inverters, each generating a multiphase AC output in the active state;

wherein the first inverter and the second inverter are configured to power a compression device of the refrigeration unit of the transport refrigeration system.

2. The method of claim 1 wherein the load on the first inverter is an electrical parameter of the first inverter.

3. The method of claim 1 wherein the load on the first inverter is a temperature of the first inverter.

4. The method of claim 1 further comprising:

placing a third inverter of the plurality of inverters in an active state upon the load on the first inverter being greater than the upper threshold and the load on the second inverter and being greater than the upper threshold;

monitoring the load on the first inverter;

monitoring the load on the second inverter;

monitoring the load on the third inverter;

comparing the load on the first inverter and the load on the second inverter and the load on the third inverter to a lower threshold;

placing one of the first inverter and the second inverter and the third inverter in an inactive state upon the load on the first inverter and the load on the second inverter and the load on the third inverter being less than the lower threshold.

5. A controller of a transport refrigeration system having a plurality of inverters configured to power a refrigeration unit, the controller comprising:

a processor;

a memory comprising computer-executable instructions that, when executed by the processor, cause the processor to perform operations, the operations comprising:

placing a first inverter of the plurality of inverters in an active state;

monitoring a load on the first inverter;

comparing the load on the first inverter to an upper threshold;

placing a second inverter of the plurality of inverters in an active state upon the load on the first inverter being greater than the upper threshold;

monitoring the load on the first inverter;

monitoring the load on the second inverter;

comparing the load on the first inverter and the load on the second inverter to a lower threshold;

placing one of the first inverter and the second inverter in an inactive state upon the load on the first inverter and the load on the second inverter being less than the lower threshold;

wherein the upper threshold and the lower threshold are different values;

wherein the first inverter and the second inverter are multiphase inverters, each generating a multiphase AC output in the active state;

wherein the first inverter and the second inverter are configured to power a compression device of the refrigeration unit of the transport refrigeration system.

6. The controller of claim 5 wherein the load on the first inverter is an electrical parameter of the first inverter.

7. The controller of claim 5 wherein the load on the first inverter is a temperature of the first inverter.

* * * * *